United States Patent [19]

Itoh et al.

[11] 4,398,399

[45] Aug. 16, 1983

[54] HERMETICALLY CIRCULATING, ABSORPTION TYPE REFRIGERATOR

[75] Inventors: Masahiko Itoh, Hitachiota; Heihatiro Midorikawa; Akira Minato, both of Hitachi; Kenji Machizawa, Chiyodamura, all of Japan

[73] Assignee: Hitachi, Ltd., Tokyo, Japan

[21] Appl. No.: 332,181

[22] Filed: Dec. 18, 1981

[30] Foreign Application Priority Data

Dec. 22, 1980 [JP] Japan ............................... 55-180436
Mar. 18, 1981 [JP] Japan ............................... 56-37946

[51] Int. Cl.³ ......................................... F25B 43/04
[52] U.S. Cl. ............................................... 62/475
[58] Field of Search ........................................ 62/475

[56] References Cited

U.S. PATENT DOCUMENTS

| | | | |
|---|---|---|---|
| 3,013,404 | 12/1961 | Endress et al. | 62/475 X |
| 3,146,602 | 9/1964 | Swearingen | 62/475 X |
| 3,167,928 | 2/1965 | Swearingen | 62/475 X |
| 3,358,465 | 12/1967 | Russell | 62/475 X |
| 3,360,950 | 1/1968 | Osborne | 62/475 X |
| 3,367,134 | 2/1968 | Bourne | 62/475 |
| 4,007,606 | 2/1977 | Yoshio | 62/475 |

*Primary Examiner*—Lloyd L. King
*Attorney, Agent, or Firm*—Antonelli, Terry & Wands

[57] ABSTRACT

In a hermetically circulating, absorption type refrigerator based on a closed circulation system of constituent members comprised of a successive communication of a regenerator, a condenser, an evaporator, an absorber and a heat exchanger, refrigeration being produced by repetitions of concentration, refrigerant dilution, and heat exchange of an aqueous concentrated lithium bromide solution sealed in the circulation system, a hydrogen gas generated in the refrigerator is continuously converted to water, condensed and removed or returned to the refrigerator as a refrigerant. The pressure increase in the refrigerator can be prevented, and a high refrigerating performance can be continuously maintained without any special maintenance.

8 Claims, 6 Drawing Figures

HERMETICALLY CIRCULATING, ABSORPTION TYPE REFRIGERATOR

BACKGROUND OF THE INVENTION

The present invention relates to a hermetically circulating, absorption type refrigerator, and more particularly to an absorption type refrigerator with a reactor for efficiently converting a hydrogen gas generated in the refrigerator to water.

Generally, a hermetically circulating, absorption-type refrigerator uses water as a refrigerant and an aqueous concentrated lithium bromide solution as absorbent. In the absorption-type refrigerator, the section having the highest temperature in the refrigeration cycle is a high temperature regenerator for concentrating the absorbent, and in the case of a double effect regenerator the maximum temperature reaches about 160° C., where the lithium bromide concentration of the absorbent is as high as about 65%. In other words, the corrosive aqueous lithium bromide solution is at the highest concentration and highest temperature and its corrosiveness is much intensified. To prevent the corrosion of materials of construction for the refrigerator, an inhibitor is usually added to the absorbent (U.S. Pat. No. 3,555,841). To this end, various inhibitors have been proposed, but have merits and demerits as the same time and fail to completely prevent the corrosion. As a result, a hydrogen gas generated by corrosion of carbon steel, major material of construction for refrigerator, is likely to accumulate in the refrigerator. However, since an absorption-type refrigerator is in an entirely hermetic structure, and works under a subatmospheric pressure of a few to a few tens of mmHg within the refrigerator, the inside pressure increases due to the generated hydrogen gas, thereby lowering the refrigeration effect. Heretofore, an operator of the refrigerator is obliged to periodically discharge the accumulated hydrogen gas to the outside of the refrigerator by an exhausting pump such as a vacuum pump. It is the recent trend that the size of absorption-type refrigerators is made smaller, and maintenance-free automatic operation is a commercially great merit for such small refrigerators, but removal of hydrogen gas generated in the refrigerators is a serious problem.

The conventional absorption-type refrigerator has an evacuation tank for storing non-condensible gases and a vacuum pump, but no refrigerators with an apparatus for converting the hydrogen gas to water to automatically maintain the inside pressure constant has not been proposed yet.

SUMMARY OF THE INVENTION

An object of the present invention is to continuously convert a hydrogen gas generated in a hermetically circulating, absorption-type refrigerator to water to remove it as water drain.

Another object of the present invention is to use the thus converted drain water as a refrigerant for the refrigerator.

To attain these objects, the present invention provides a hermetically circulating, absorption-type refrigerator with a unit of converting a hydrogen gas generated in the refrigerator to water by oxidation through contact with a metal oxide having a negative free energy change at the reaction with the hydrogen gas as a oxygen supply source to remove the thus obtained water drain or return it as the refrigerant to the refrigerator.

That is, according to the present invention, a hydrogen gas generated in high temperature and low temperature regenerators of a hermetically circulating, absorption-type refrigerator is oxidized to water for removal or returning the resulting water drain as a refrigerant to the refrigerator, and a reactor for converting a hydrogen gas to water, filled with a metal oxide, particularly copper oxide, is provided in a line between the condenser and an evacuation tank. The reactor can be heated by the waste heat from the high temperature regenerator or by an electric heater, thereby converting the hydrogen gas generated in the refrigerator to water in a vapor state, and cooling the water to condense the water vapor. The condensed water drain is removed or returned as the refrigerant to the refrigerator. It is most preferable for reducing the volume of a hydrogen gas to convert it to a liquid water.

For the oxidation of hydrogen gas, a process using a catalyst, a process using an oxidizing agent, a process using a reduction reaction of a metal oxide, etc. are available, but the process using a catalyst is usually expensive and additionally needs an oxidizing agent. The use of oxidizing agent promotes corrosion of the materials of construction for refrigerator, and is not preferable. Furthermore, the oxidizing agent is usually expensive, and its regeneration is also difficult to conduct. On the other hand, the process using a metal oxide is usually cheap, though dependent upon its kind, and its regeneration is easy to conduct.

More particularly, any metal oxide, so long as it has a negative free energy change at the reaction of reducing the metal oxide with hydrogen, can be employed in principle. Copper oxide is most preferable among others. Copper oxide has a negative free energy change at the reaction with hydrogen even at the ordinary temperature, and thus the reaction can proceed even at the ordinary temperature in principle. However, practically it is preferable to elevate the reaction temperature to rapidly convert the generated hydrogen gas to water.

Relations between percent hydrogen removal and temperature obtained by the present inventors when copper oxide (CuO) is used are shown in FIG. 1. It is seen therefrom that the percent hydrogen removal is increased with increasing reaction temperature, and hydrogen can be removed as water at a temperature of at least about 250° C. Thus, it is preferable to heat the reactor by an electric heater or others. However, in a hermetically circulating, absorption-type refrigerator, a combustion waste gas at a few hundred °C. is discharged from the boiler of high temperature regenerator, and the waste heat of the waste gas can be utilized to heat the reactor to the reaction temperature without any requirement for additional energy, as described before.

In the reaction of oxidizing hydrogen with copper oxide, a larger surface area of copper oxide is more preferable, and is greatly influenced with the packing amount or packing density. If the packing amount or packing density is too large, it is more difficult to rapidly withdraw the hydrogen gas generated in the refrigerator, because a pressure difference is not so large between the refrigerator and the evacuation tank. In that case, it is thus an important problem whether the copper oxide can undergo effective reaction to metallic copper not only at the surface level, but also deep within the inside.

Results of reactivity of copper oxide obtained by the present inventors are shown in FIG. 2, where 19 g of copper oxide short wire chips (0.05 cm in diameter and 0.5 cm long) was filled in a quartz tube having an inner diameter of 1 cm and heated at 290° C., a hydrogen gas was passed therethrough at a flow rate of 3 ml/min, and a hydrogen gas concentration of the effluent from the quartz tube was analyzed by gas chromatography. As is evident from FIG. 2, the hydrogen removal maintains 100% before 30 hours, but abruptly drops after 30 hours. This is in good agreement with the theoretically calculated result on the assumption that all 19 g of CuO undergoes 100% reaction according to the following reaction equation. That is, copper oxide can undergo 100% reaction.

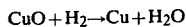

$$CuO + H_2 \rightarrow Cu + H_2O$$

In the present invention, the hydrogen gas generated in the refrigerator is converted to water in a vapor state in a reactor filled with copper oxide, and the resulting water vapor is condensed to liquid water in a successive cooler to remove it or return it as the refrigerant to the refrigerator.

Preferable form of the copper oxide for the reactor is wire chips, pellets, granules, etc. to make the available surface area as large as possible. In the present invention, copper oxide is preferably used, because of higher reaction rate at a relatively low temperature, but iron oxide, nickel oxide, cobalt oxide, lead oxide, etc. can be used. As is obvious from FIG. 1, reaction can proceed at a temperature of at least 100° C., but practically at a temperature of over 100° C. to 300° C. A temperature above 300° C. is not preferable on account of energy saving. Water vapor resulting from the reaction with copper oxide is condensed in the cooler provided after the reactor, whereby no more gas enters into the evacuation tank and the inside pressure can be kept constant as desired in the refrigerator. That is, stable operation of the refrigerator can be conducted under the constant inside pressure. Cooling water circulating through the refrigerator can be used for the cooler for condensing the water vapor. When the resulting water drain is retained in the cooler, a cooler having a storing capacity as small as about 1.5 l is only required for the ordinary refrigerator on the basis of operating time of the refrigerator being about 1,000 hours/year and a free maintenance period being 5 years.

The present invention will be described in detail below, referring to the accompanying drawings.

PREFERRED EMBODIMENTS OF THE INVENTION

Figure 1:
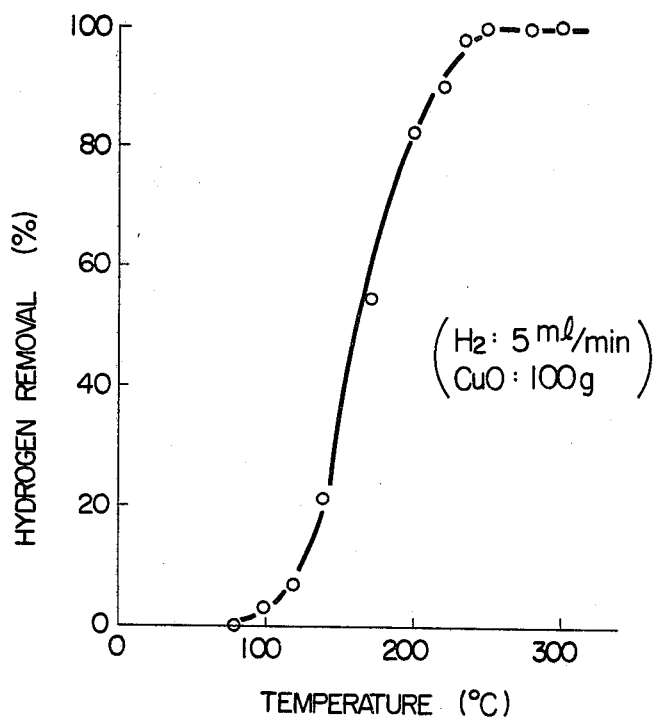
FIG. 1 is a diagram showing relations between percent hydrogen removal and reaction temperature.
Figure 2:
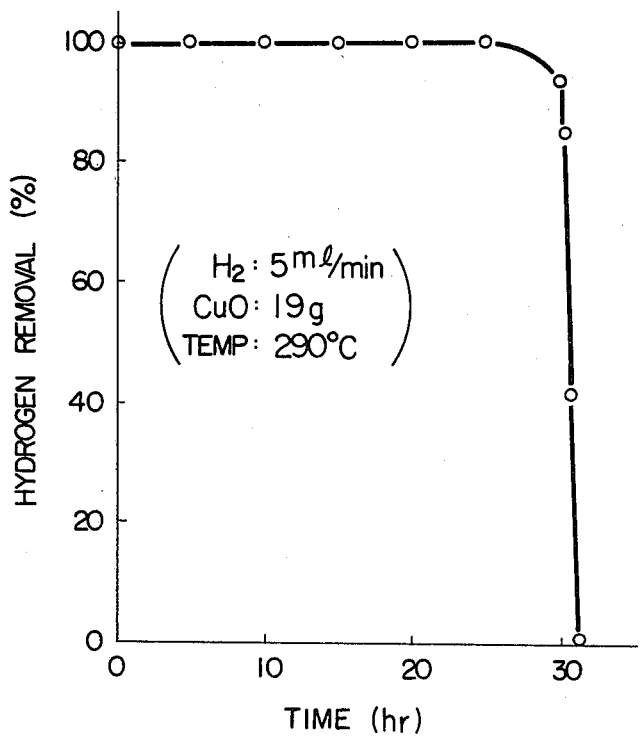
FIG. 2 is a diagram showing relations between percent hydrogen removal and time.
Figure 3:
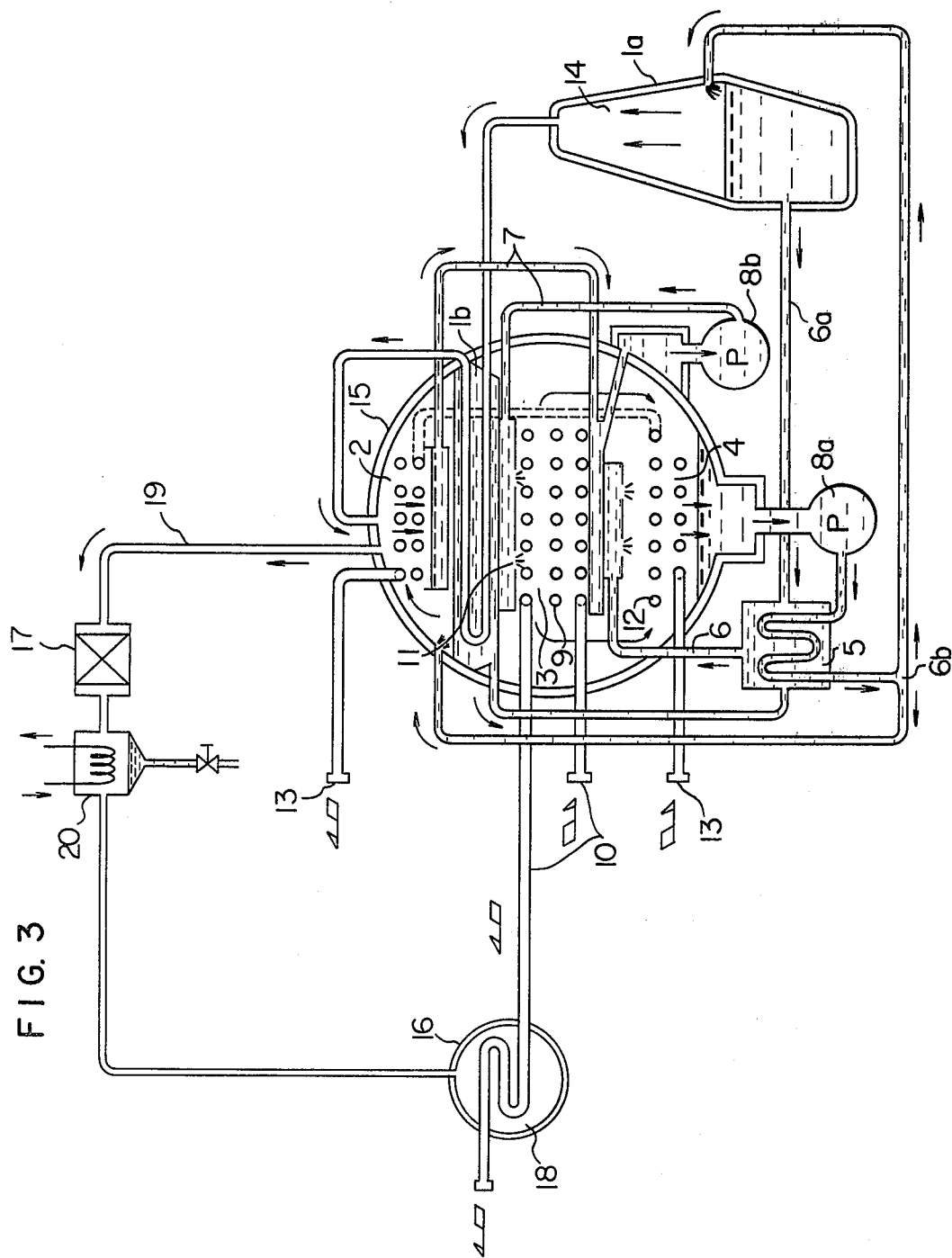
FIG. 3 is a schematic flow diagram showing one embodiment of a hermetically circulating, absorption-type refrigerator according to the present invention.

Generally, a hermetically circulating, absorption-type refrigerator uses water as a refrigerant and an aqueous concentrated lithium bromide solution as an absorbent. As shown in FIG. 3, the refrigerator comprises regenerators 1a and 1b, condenser 2, evaporator 3, absorber 4 and pumps 8a and 8b for circulating absorbents 6, 6a and 6b and refrigerant 7, respectively, and heat exchanger 5. The respective members work as follows:

(A) Evaporator 3

Cold water 10 passes through an evaporator tube bundle 9 of evaporator 3, and refrigerant 7 supplied by refrigerant pump 8b is sprayed onto the outside of the evaporator tube bundle through spray nozzles 11. Heat is deprived from the cold water by the latent heat of evaporation of the refrigerant.

(B) Absorber 4

An aqueous lithium bromide solution has a considerably lower vapor pressure than that of water at the same temperature, and can absorb water vapor generated at a considerably low temperature. The refrigerant vapor generated in evaporator 3 is absorbed into the aqueous lithium bromide solution 6 sprayed as absorbent onto the outside surface of cooling tube bundle 12 of absorber 4, and the generated heat of absorption is deprived by cooling water 13 passing through the cooling tube bundle 12.

(C) Regenerators 1a and 1b

Dilute absorbent 6b whose lithium bromide concentration has been lowered by absorption of the refrigerant in absorber 4 has a decreased water absorbability, and thus is partly led to high temperature regenerator 1a by absorbent circulation pump 8a and heated therein by a gas burner, etc. to evaporate the refrigerant into refrigerant vapor 14 while concentrating the absorbent, and the concentrated lithium bromide solution 6a is returned to absorber 4. A portion of the dilute solution from absorber 4 is led to low temperature regenerator 1b by absorbent circulation pump 8a, heated and concentrated by hot refrigerant vapor 14 generated in high temperature regenerator 1a and mixed with the concentrated solution from high temperature regenerator 1a to produce concentrated solution 6, which is returned to absorber 4.

(D) Condenser 2

Hot refrigerant vapor 14 from high temperature regenerator 1a releases a portion of its heat in low temperature regenerator 1b and enters into condenser 2, and is cooled therein by cooling water 13 passing through a cooling tube bundle 15, and condensed into liquid refrigerant 7, which is returned to evaporator 3.

(E) Heat exchanger 5

Dilute solution 6b at the low temperature flowing toward high temperature regenerator 1a and low temperature regenerator 1b from absorber 4 is preheated by concentrated solution 6a at the high temperature flowing toward absorber 4 from high temperature regenerator 1a and low temperature regenerator 1b to reduce the heating requirement of regenerator 1a.

(F) Pumps 8a and 8b

Absorbent circulation pump 8a circulates an aqueous lithium bromide solution as an absorbent, and refrigerant circulation pump 8b circulates water as a refrigerant.

Absorber 4, regenerators 1a and 1b and pumps 8a and 8b perform the same function as that of a compression-type refrigerator. Absorbent circulates between regenerators 1a and 1b and absorber 4 through heat exchanger 5 during the operation of refrigerator. The higher the concentration of absorbent, generally the higher the refrigeration efficiency. Thus, in order to concentrate the absorbent, it is necessary to maintain the regenerators at a higher temperature. On the other hand, the higher the temperature and concentration of absorbent, i.e. aqueous lithium bromide solution, the higher the corrosion of steel or copper as the materials of construction for a refrigerator.

When the aqueous lithium bromide solution is concentrated in high temperature regenerator 1a and low temperature regenerator 1b in the refrigerator, water vapor and simultaneously a hydrogen gas generated by corrosion of steel evolve, and the generated hydrogen gas is accumulated within the refrigerator, thereby increasing the inside pressure and giving an adverse effect upon the refrigeration efficiency.

According to the present invention, a reactor for converting the hydrogen gas generated due to the corrosion of the materials of construction in the high and low temperature regenerators to water by oxidation is provided between the condenser of a hermetically circulating, absorption-type refrigerator and an evaculation tank 16 annexed to the refrigerator. Reactor 17 is packed with a metal oxide, particularly copper oxide, and heated to a desirable reaction temperature by a heater such as an electric heater or by waste heat from the high temperature regenerator.

Conversion of the hydrogen gas to water through the reactor for removal will be described below.

The hydrogen gas generated in high temperature regenerator 1a and low temperature regenerator 1b is led to condenser 2 together with water vapor. The water vapor is condensed to liquid water therein, separating the hydrogen gas therefrom. Since cold water 10 obtained in evaporator 3 passes through cooling tube 18 in evacuation tank 16, the inside pressure in the evacuation tank is kept lower than that in condenser 2, and consequently the hydrogen gas in condenser 2 is withdrawn therefrom to reactor 17 through evacuation line 19 by suction. Reactor 17 is packed with copper oxide and heated by a heater, where the copper oxide reacts with the hydrogen gas to form water vapor. The water vapor is led to cooler 20 and condensed to water drain. The water drain can be discharged to the outside of the refrigerator. The volume of hydrogen gas can be considerably reduced by converting it to water drain, and thus the frequency of discharging can be reduced, as compared with that of conventional discharging of a hydrogen gas by a vacuum pump.

Figure 4:
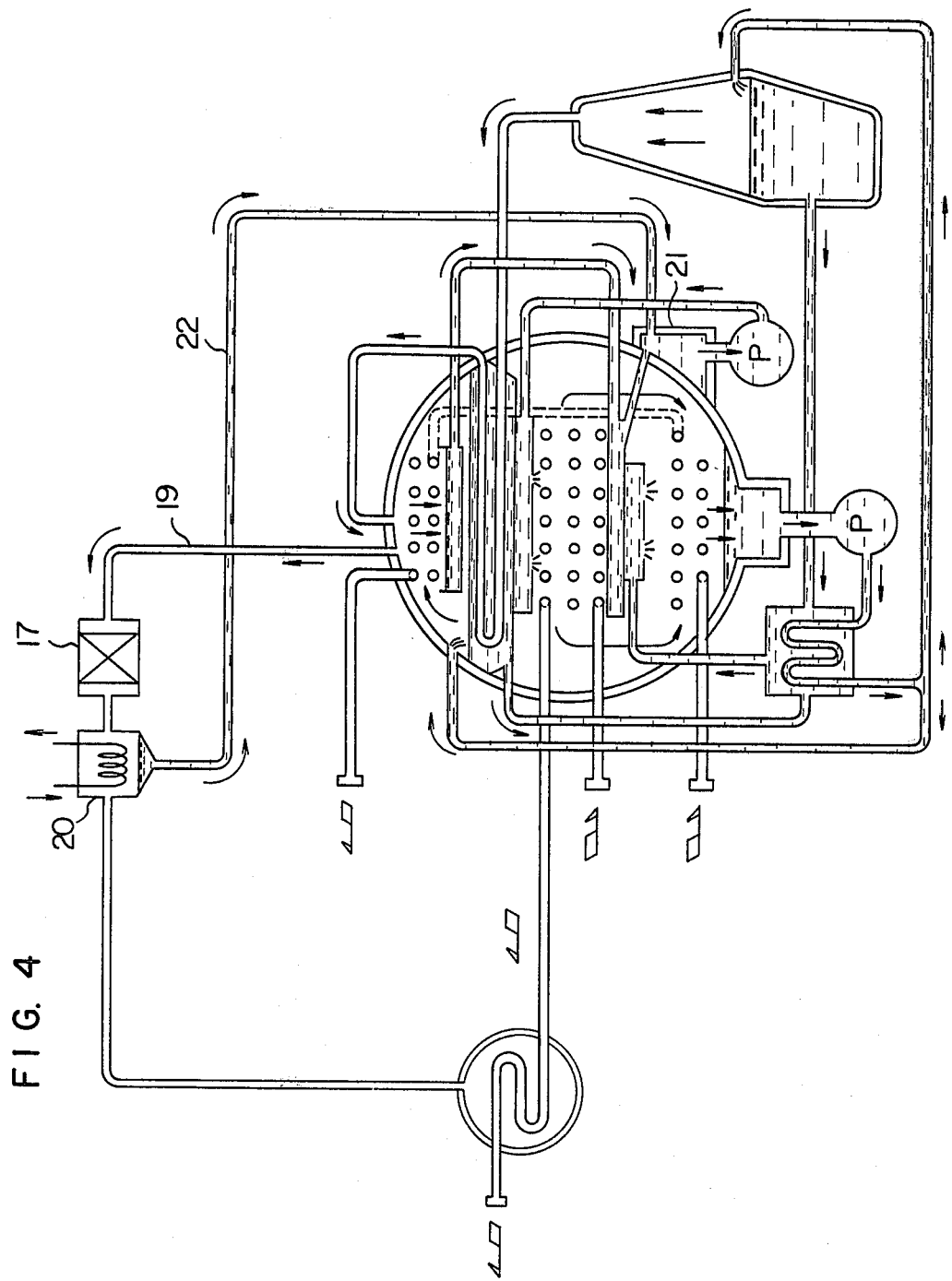
FIG. 4 is a schematic flow diagram showing another embodiment of a hermetically circulating, absorption-type refrigerator according to the present invention.

Furthermore, as shown in FIG. 4, the hydrogen gas is converted to water vapor in reactor 17 and the water vapor is condensed into water drain in cooler 20. Then, the water drain is returned to refrigerant tank 21 through refrigerant return line 22 connecting cooler 20 to refrigerant tank 21 and used as the refrigerant, whereby the vacuumness within the refrigerator is not broken and the hydrogen gas can be treated in a completely hermetical system, thereby keeping the inside pressure constant. In FIG. 4, the reference numerals of the same members as in FIG. 3 are omitted for quick distinction between the embodiments of FIG. 3 and FIG. 4.

The present invention will be explained in detail below, referring to Examples.

EXAMPLE 1

A reactor for converting a hydrogen gas to water was provided on the way of an evacuation line from a condenser to an evacuation tank in a gas-fired, double effect, absorption-type refrigerator having a refrigeration capacity of 250 RT, as shown in FIG. 3. The reactor was a perforated stainless steel vessel having an inner diameter of 3 cm and a length of 20 cm, packed with 100 g of copper oxide wire chips having a diameter of 0.05 cm and a length of 0.5 cm, and a cooler with a copper spiral tube passing cooling water at 25° C. therethrough was annexed after the reactor. The refrigerator was operated under full load, and the reactor was heated and kept at 250° C. with the waste heat of the high temperature regenerator of the refrigerator. The gas was sampled from the evacuation tank by a vacuum pump and analyzed by gas chromatography, and it was found that no hydrogen gas was detected even after 100 hours from the start of operation, and further that no inside pressure increase of the refrigerator was observed at all.

EXAMPLE 2

The conversion and cooling were carried out in the same manner as in Example 1, except that the temperature of the reactor was kept at 200° C., and the gas analysis was carried out for the evacuation tank. No hydrogen gas was detected even after 100 hours, and no inside pressure increase of the refrigerator was observed at all.

EXAMPLE 3

Metallic copper was collected from the reactor used in Examples 1 and 2 after the reaction, and heated in the air at 400° C. for 5 hours. The thus obtained copper oxide was packed in a reactor having a diameter of 2 cm and a length of 20 cm, and kept at a reaction temperature of 300° C. Reaction and cooling were carried out in the same manner as in Example 1, and gas analysis was carried out for the evacuation tank after 50 hours from the start of operation. No hydrogen gas was detected.

EXAMPLE 4

Figure 5:
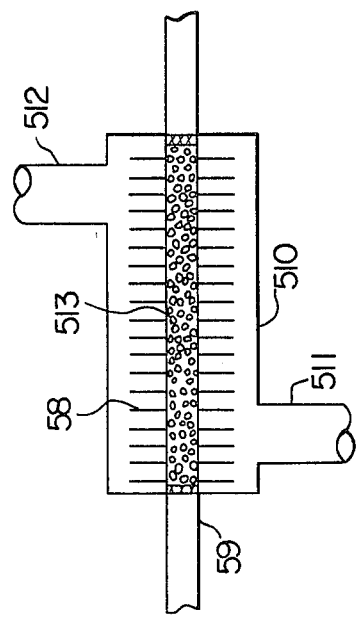
FIG. 5 is a schematic cross-sectional view of one embodiment of a reactor for converting a hydrogen gas to water according to the present invention.

A reactor is comprised of a stainless steel inner cylinder 51 having a diameter of 3 cm and being provided with heat exchanging fins 58, an outer cylinder 510 having a diameter of 15 cm, an inlet pipe 511 for introducing an effluent gas from the high temperature regenerator, a gas outlet pipe 512 and copper oxide wire chips 513 having a diameter of 0.05 cm and a length of 0.5 cm packed in inner cylinder 59, as shown in FIG. 5.

Figure 6:
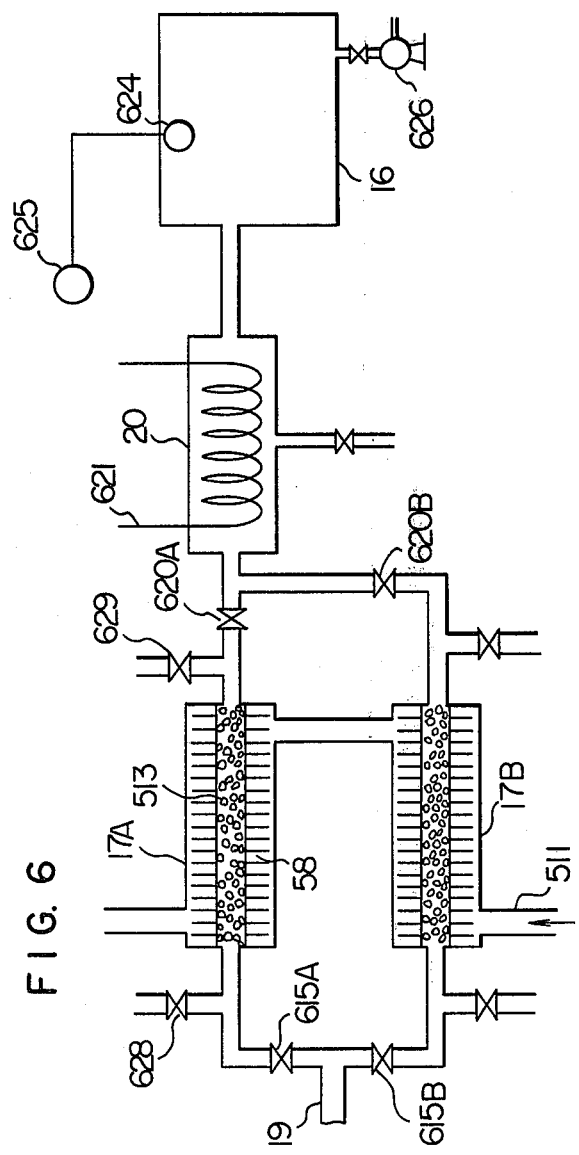
FIG. 6 is a schematic flow diagram showing one embodiment of reactor operation in a hermetically circulating, absorption-type refrigerator according to the present invention.

Two units 17A and 17b of the reactor was arranged in parallel in an evacuating line of a gas-fired, double effect, absorption-type refrigerator having a refrigeration capacity of 125 RT as shown in FIG. 6.

The hydrogen gas generated in the high and low temperature regenerators was led to reactor 17A through evacuating line 19 and valve 615A, where valve 620A was open, whereas valves 615B and 620B were closed.

CuO wire chips 513 in reactor 17a was heated to about 300° C. by the effluent gas at the temperature of about 500° C. from the high temperature regenerator through heating gas line 511, whereby heating efficiency of copper oxide was elevated by heat-exchanging fins 58. The hydrogen gas reacted with the copper oxide in reactor 17A to produce water vapor, whereas the copper oxide was reduced to metallic copper by the reaction. The produced water vapor was led to cooler 20 with spiral tube 621 passing cooling water therethrough through valve 620A and condensed to water drain. Hydrogen detector 624 was provided in evacuation tank 16 to alarm inflow of the hydrogen gas into evacuation tank 16 by alarm 625.

The double effect, absorption-type refrigerator of 125 RT was operated under full load for 50 hours, but no alarm of inflow of hydrogen into evacuation tank 16 was made at all. A gas was sampled from evacuation tank 16 by vacuum pump 626 and analyzed by gas chromatography, but no hydrogen was detected at all.

Operation was further continued, and alarm 625 was actuated after 500 hours, and inflow of hydrogen into evacuation tank 16 was detected. Then, valves 615A and 620A were closed, and valves 625B and 620B were made open to pass the hydrogen gas through reactor 17B, and the very small amount of hydrogen in evacuation tank 16 was discharged therefrom by vacuum pump 626, whereby alarm 625 was placed out of actuation. Thereafter, operation of the refrigeration was continued smoothly. The reduced metallic copper in reactor 17A was regenerated to copper oxide by opening air valves 628 and 629 to introduce air therein.

According to the present invention, the hydrogen gas generated in a refrigerator can be efficiently and continuously converted to water in a simple manner, and removed or returned to the refrigerator as a refrigerant, whereby the inside pressure increase can be prevented, and a high refrigeration performance can be continuously maintained without any maintenance. Furthermore, the reaction product can be regenerated while the hydrogen gas is continuously converted to water and removed or returned to the refrigerator as the refrigerant. The present invention has a large economical effect on utilization of waste gas as well as energy saving.

What is claimed is:

1. In a hermetically circulating, absorption type refrigerator based on a closed circulation system of constituent members comprised of a successive communication of a regenerator, a condenser, an evaporator, an absorber and a heat exchanger, refrigeration being produced by repetitions of concentration, refrigerant dilution, and heat exchange of an aqueous concentrated lithium bromide solution sealed in the circulation system, the improvement which comprises as evacuation tank for evacuating a hydrogen gas generated in the refrigerator, the evacuation tank being connected to the condenser through a conduit, and a reactor for converting the hydrogen gas to water, the reactor being provided with an oxygen supply source and provided in the conduit between the evacuation tank and the condenser.

2. In a hermetically circulating, absorption type refrigerator based on a closed circulation system of constituent members comprised of a successive communication of a regenerator, a condenser, an evaporator, and an absorber and a heat exchanger, refrigeration being produced by repetitions of concentration, refrigerant dilution, and heat exchange of an aqueous concentrated lithium bromide solution sealed in the circulation system, the improvement which comprises an evacuation tank for evacuating a hydrogen gas generated in the refrigerator, the evacuation tank being connected to the condenser through a conduit, a reactor for converting the hydrogen gas to water, the reactor being provided with an oxygen supply source and provided in the conduit between the evacuation tank and the condenser, and a cooler for condensing the water in a vapor state converted in the reactor into a liquid state, the cooler being provided after the reactor in the conduit between the evacuation tank and the condenser.

3. In a hermetically circulating, absorption type refrigerator based on a closed circulation system of constituent members comprised of a successive communication of a regenerator, a condenser, an evaporator, an absorber and a heat exchanger, refrigeration being produced by repetitions of concentration, refrigerant dilution, and heat exchange of an aqueous concentrated lithium bromide solution sealed in the circulation system, the improvement which comprises an evacuation tank for evacuating a hydrogen gas generated in the refrigerator, the evacuation tank being connected to the condenser through a conduit, a reactor for converting the hydrogen gas to water, the reactor being provided with an oxygen supply source and provided in the conduit between the evacuation tank and the condenser, and a cooler for condensing the water in a vapor state converted in the reactor into a liquid state, the cooler being provided after the reactor in the conduit between the evacuation tank and the condenser, and provided with a conduit for discharging the condensed water to the outside of the refrigerator.

4. In a hermetically circulating, absorption type refrigerator based on a closed circulation system of constituent members comprised of a successive communication of a regenerator, a condenser, an evaporator, an absorber and a heat exchanger, refrigeration being produced by repetitions of concentration, refrigerant dilution, and heat exchange of an aqueous concentrated lithium bromide solution sealed in the circulation system, the improvement which comprises an evacuation tank for evacuating a hydrogen gas generated in the refrigerator, the evacuation tank being connected to the condenser through a conduit, a reactor for converting the hydrogen gas to water, the reactor being provided with an oxygen supply source and provided in the conduit between the evacuation tank and the condenser, and a cooler for condensing the water in a vapor state converted in the reactor into a liquid state, the cooler being provided after the reactor in the conduit between the evacuation tank and the condenser, and provided with a conduit for returning the condensed water to the refrigerator as a refrigerant.

5. The hermetically circulating, absorption type refrigerator according to any one of claims 1 to 4, wherein the reactor is filled with copper oxide as the oxygen supply source.

6. The hermetically circulating, absorption type refrigerator according to any one of claims 1 to 4, wherein the reactor is heated by an effluent gas from the regenerator.

7. The hermetically circulating, absorption type refrigerator according to any one of claims 1 to 4, wherein the evacuation tank is provided with a hydrogen detector.

8. The hermetically circulating, absorption type refrigerator according to any one of claims 1 to 4, wherein the reactor consists of at least two units and is provided in parallel, thereby converting the hydrogen gas into water in one unit while regenerating the used oxygen supply source in another unit.

* * * * *